US012619738B2

(12) United States Patent
Rafikov et al.

(10) Patent No.: US 12,619,738 B2
(45) Date of Patent: May 5, 2026

(54) GENERATING TEST DATA

(71) Applicant: Dell Products L.P., Round Rock, TX (US)

(72) Inventors: Rustem Rafikov, Hopkinton, MA (US); Christopher Jones, Plainville, MA (US); Philippe Armangau, Kalispell, MT (US); Sathya Krishna Murthy, Morrisville, NC (US); Bruce A. Zimmerman, Concord, MA (US)

(73) Assignee: Dell Products L.P., Round Rock, TX (US)

( * ) Notice: Subject to any disclaimer, the term of this patent is extended or adjusted under 35 U.S.C. 154(b) by 173 days.

(21) Appl. No.: 18/423,534

(22) Filed: Jan. 26, 2024

(65) Prior Publication Data
US 2025/0245342 A1 Jul. 31, 2025

(51) Int. Cl.
| | |
|---|---|
| *G06F 21/57* | (2013.01) |
| *G06F 11/3668* | (2025.01) |
| *G06F 21/55* | (2013.01) |
| *G06F 21/56* | (2013.01) |

(52) U.S. Cl.
CPC ........ G06F 21/577 (2013.01); G06F 11/3684 (2013.01); G06F 21/552 (2013.01); G06F 21/566 (2013.01)

(58) Field of Classification Search
CPC .... G06F 21/577; G06F 21/552; G06F 21/566; G06F 11/3684
See application file for complete search history.

(56) References Cited

U.S. PATENT DOCUMENTS

| | | | | |
|---|---|---|---|---|
| 6,781,589 | B2* | 8/2004 | Macy ..................... | G06F 5/065 |
| | | | | 345/559 |
| 10,664,165 | B1* | 5/2020 | Faibish ................. | G06F 3/0638 |
| 11,372,705 | B1 | 6/2022 | Minarik et al. | |
| 11,748,210 | B2 | 9/2023 | Minark et al. | |
| 11,768,936 | B2 | 9/2023 | Herman et al. | |
| 11,822,656 | B2 | 11/2023 | Gehtman et al. | |
| 2010/0205158 | A1* | 8/2010 | Dybas ................. | G06F 16/1748 |
| | | | | 711/E12.001 |

(Continued)

OTHER PUBLICATIONS

Davies, Simon R, Richard Macfarlane, and William J Buchanan. "Review of Current Ransomware Detection Techniques." 2021 International Conference on Engineering and Emerging Technologies (ICEET). IEEE, 2021. 1-6. Web. (Year: 2021).*

*Primary Examiner* — Shanto Abedin
*Assistant Examiner* — James P Moles
(74) *Attorney, Agent, or Firm* — BainwoodHuang

(57) ABSTRACT

A technique is directed to generating test data to be written in a predefined testing environment. The technique includes receiving an entropy value indicating an amount of entropy of write data of a completed write operation to be mimicked by the test data, and a deduplication value indicating a target deduplication ratio of the test data in the predefined testing environment. The technique further includes identifying, based on the entropy value, a particular data buffer from a predefined plurality of data buffers. The technique further includes, after identifying the particular data buffer, modifying at least part of the particular data buffer based on the deduplication value to generate a modified data buffer as the test data.

18 Claims, 5 Drawing Sheets

(56) References Cited

U.S. PATENT DOCUMENTS

| | | | |
|---|---|---|---|
| 2014/0068563 A1* | 3/2014 | Saltzman | G06F 11/368 |
| | | | 717/124 |
| 2016/0267277 A1* | 9/2016 | Muthurajan | G06F 21/577 |
| 2019/0034450 A1* | 1/2019 | Dangi | G06F 16/1748 |
| 2020/0042218 A1* | 2/2020 | Faibish | G06F 3/0641 |
| 2020/0099699 A1* | 3/2020 | Saad | G06F 11/2076 |
| 2020/0341667 A1* | 10/2020 | Bassov | H03M 7/3091 |
| 2020/0349118 A1* | 11/2020 | Faibish | G06F 16/1744 |
| 2021/0182458 A1* | 6/2021 | Lin | G06F 21/60 |
| 2022/0129190 A1* | 4/2022 | Bassov | G06F 3/067 |
| 2024/0241974 A1* | 7/2024 | Mola | G06F 11/34 |

* cited by examiner

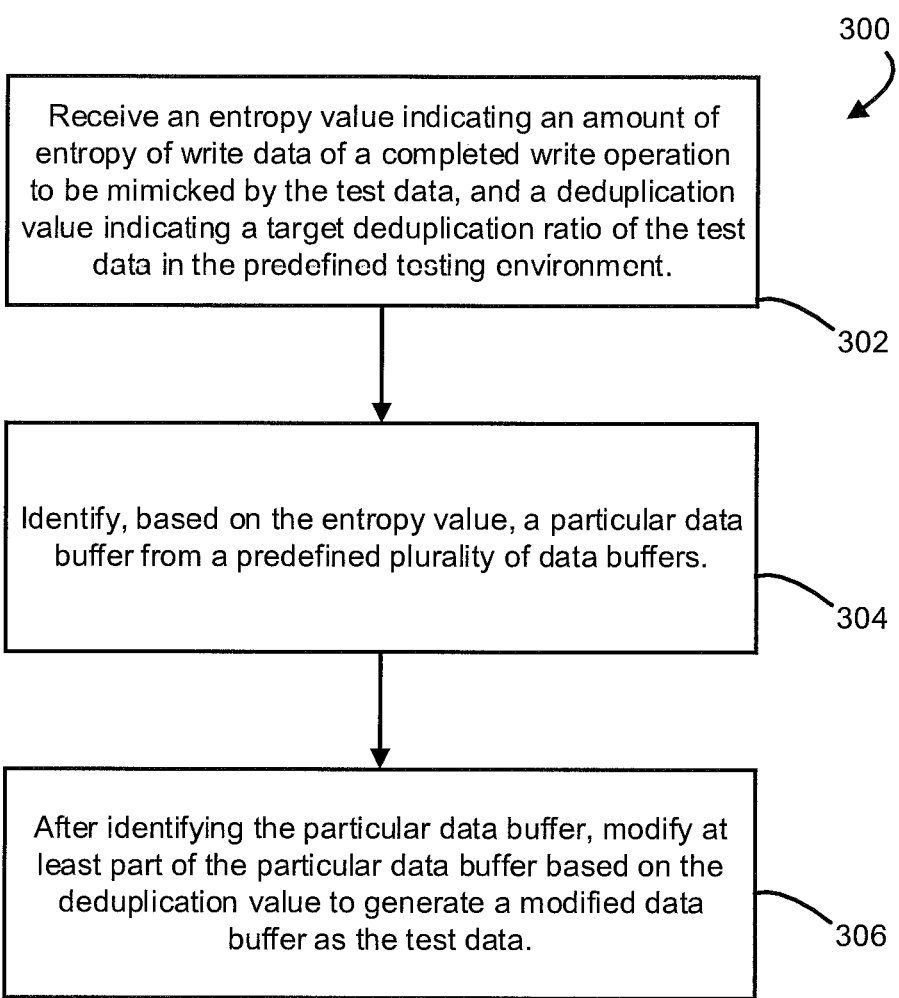

300

Receive an entropy value indicating an amount of entropy of write data of a completed write operation to be mimicked by the test data, and a deduplication value indicating a target deduplication ratio of the test data in the predefined testing environment.

302

Identify, based on the entropy value, a particular data buffer from a predefined plurality of data buffers.

304

After identifying the particular data buffer, modify at least part of the particular data buffer based on the deduplication value to generate a modified data buffer as the test data.

GENERATING TEST DATA

BACKGROUND

Providers of ransomware protection tools test their tools in a controlled environment in which IO operations are performed on data. The ransomware protection tools monitor the IO operations to detect and mitigate ransomware attacks.

For lack of availability, security concerns, or otherwise, providers of ransomware protection tools use simulated user data during testing, rather than actual user data that was read or written during a ransomware attack. Such simulated user data contains random data that mimics the actual user data.

SUMMARY

Unfortunately, there are deficiencies in generating simulated user data that accurately reflects the actual user data that was read or written during a ransomware attack. In some cases, the simulated user data contains only some of the properties of the actual user data and fails to reflect other properties that are indicative of a ransomware attack (e.g., high entropy, low dedupability, etc.). Differences between the simulated user data and the actual user data detrimentally affect the development and effectiveness of ransomware protection tools.

In contrast to the above-described conventional data storage system, improved techniques are directed to generating test data by modifying a predefined data buffer to accurately reflect actual write data. Along these lines, an IO trace provides an entropy value of write data for a completed write operation. The predefined data buffer is selected based on the entropy value. The predefined data buffer is then modified to generate a modified data buffer that meets a target deduplication ratio. In this manner, test data is quickly and efficiently generated while accurately reflecting the actual write data.

One embodiment is directed to a method of generating test data to be written in a predefined testing environment. The method includes receiving an entropy value indicating an amount of entropy of write data of a completed write operation to be mimicked by the test data, and a deduplication value indicating a target deduplication ratio of the test data in the predefined testing environment. The method further includes identifying, based on the entropy value, a particular data buffer from a predefined plurality of data buffers. The method further includes, after identifying the particular data buffer, modifying at least part of the particular data buffer based on the deduplication value to generate a modified data buffer as the test data.

Another embodiment is directed to an electronic apparatus that includes memory and control circuitry coupled with the memory. The memory stores instructions that, when carried out by the control circuitry, cause the control circuitry to perform a method of generating test data to be written in a predefined testing environment, the method including:

A. receiving an entropy value indicating an amount of entropy of write data of a completed write operation to be mimicked by the test data, and a deduplication value indicating a target deduplication ratio of the test data in the predefined testing environment;

B. identifying, based on the entropy value, a particular data buffer from a predefined plurality of data buffers; and C. after identifying the particular data buffer, modifying at least part of the particular data buffer based on the deduplication value to generate a modified data buffer as the test data.

Yet another embodiment is directed to a computer program product having a non-transitory computer readable medium that stores a set of instructions to generate test data to be written in a predefined testing environment, the set of instructions, when carried out by computerized circuitry, causes the computerized circuitry to perform a method of:

A. receiving an entropy value indicating an amount of entropy of write data of a completed write operation to be mimicked by the test data, and a deduplication value indicating a target deduplication ratio of the test data in the predefined testing environment;

B. identifying, based on the entropy value, a particular data buffer from a predefined plurality of data buffers; and C. after identifying the particular data buffer, modifying at least part of the particular data buffer based on the deduplication value to generate a modified data buffer as the test data.

In some embodiments, modifying at least part of the particular data buffer includes replacing at least part of the particular data buffer with a predefined sequence of bits to increase an amount of deduplication available to be performed on the modified data buffer.

In some embodiments, modifying at least part of the particular data buffer includes replacing at least part of the particular data buffer with a unique sequence of bits to decrease an amount of deduplication available to be performed on the modified data buffer. The unique sequence of bits is unique from data stored in the predefined testing environment.

In some embodiments, the method further includes pre-generating the particular data buffer to include a first group of bits and a second group of bits. Each bit in the first group of bits has a value of zero. Further, a number of bits in the first group of bits is based on a target entropy range.

In some embodiments, modifying at least part of the particular data buffer includes adjusting the second group of bits while refraining from adjusting the first group of bits to maintain entropy of the particular data buffer within the target entropy range.

In some embodiments, the method further includes generating, as the predefined plurality of data buffers, a first set of data buffers and a second set of data buffers. The first set of data buffers has a respective first set of entropy values within a first range of entropy values. The second set of data buffers has a respective second set of entropy values within a second range of entropy values. Additionally, identifying the particular data buffer from the predefined plurality of data buffers includes:

A. mapping the entropy value of the write data to the first range of entropy values; and B. in response to mapping the entropy value of the write data to the first range of entropy values, providing the particular data buffer from the first set of data buffers.

In some embodiments, receiving the entropy value includes obtaining the entropy value from an input/output (IO) trace of the completed write operation, the completed write operation being performed on a first platform running a first operating system (OS). Additionally, the method further includes writing the test data on, as the predefined testing environment, a second platform running a second OS that is different from the first OS.

In some embodiments, the method further includes receiving an IO size of the write data to be mimicked by the test data, the IO size being larger than the particular data buffer. Additionally, the method further includes combining the modified data buffer with a second modified data buffer to generate a combined data buffer that matches the IO size of the write data.

In some embodiments, the method further includes, after modifying at least part of the particular data buffer to generate the modified data buffer, receiving an instruction to generate additional test data. Additionally, the method further includes, in response to receiving the instruction to generate additional test data, identifying the particular data buffer from the predefined plurality of data buffers. Additionally, the method further includes modifying the particular data buffer to generate a second modified data buffer as the additional test data. The second modified data buffer is different from the modified data buffer.

In some embodiments, the completed write operation occurred as part of an actual ransomware attack. Additionally, method further includes issuing a write request to store the test data to storage of the testing environment as part of a simulated ransomware attack in the testing environment. The simulated ransomware attack is a simulation of the actual ransomware attack.

This Summary is provided merely for purposes of summarizing some example embodiments so as to provide a basic understanding of some aspects of the disclosure. Accordingly, it will be appreciated that the above-described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

FIG. 3 is a flowchart of a procedure that is performed by specialized equipment in accordance with certain embodiments.

DETAILED DESCRIPTION

An improved technique is directed to generating test data by modifying a predefined data buffer to mimic actual write data. Along these lines, an IO trace provides an entropy value of write data for a completed write operation. Using the entropy value, a particular data buffer is identified from a predefined plurality of data buffers. The particular data buffer is then modified to generate a modified data buffer that meet a target deduplication ratio. The modified data buffer is provided as the test data to be written in a testing environment. In this manner, test data is quickly and efficiently generated while accurately reflecting the actual write data.

Figure 1:
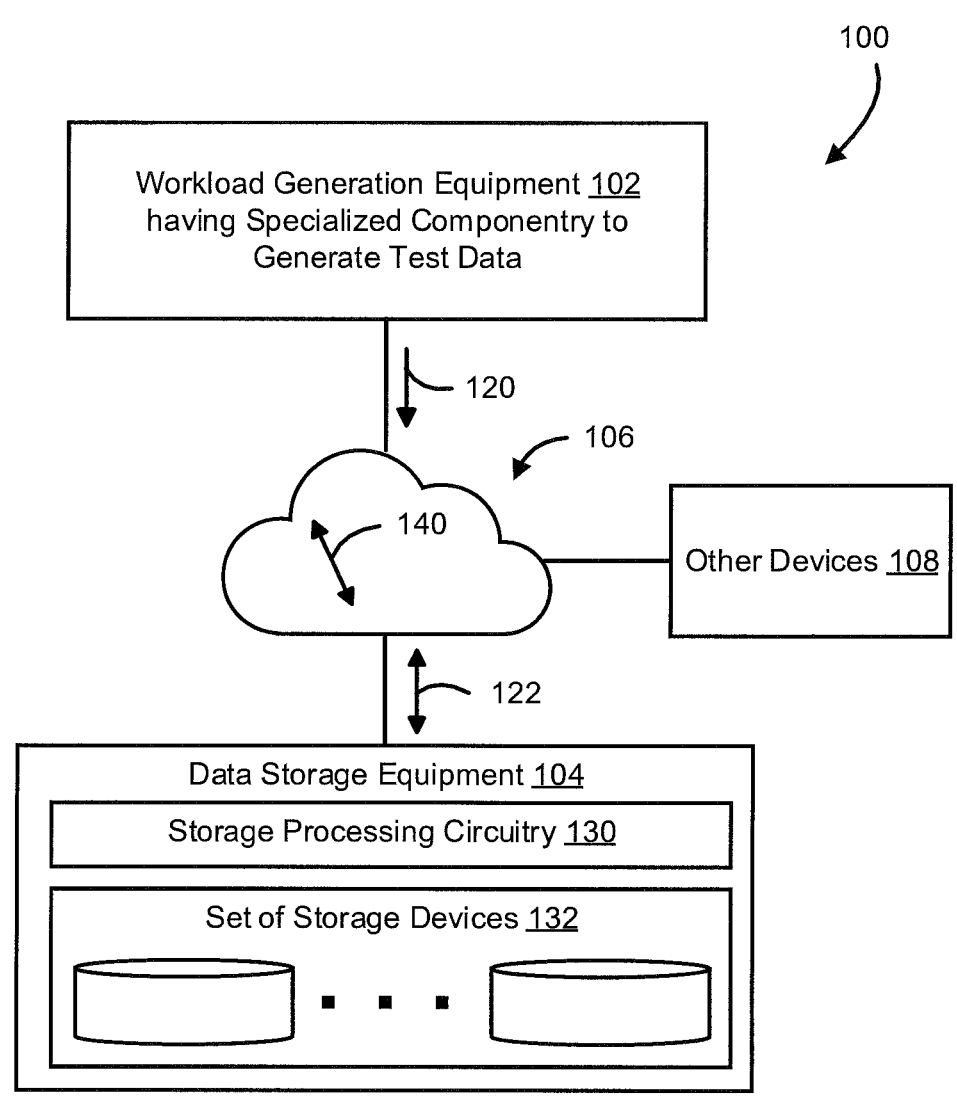
FIG. 1 is a block diagram of an example environment in accordance with certain embodiments.

FIG. 1 shows an example electronic environment 100 that generates and writes test data in accordance with certain embodiments. The electronic environment 100 includes workload generation equipment 102, data storage equipment 104, communications medium 106, and optionally other devices 108.

The workload generation equipment 102 is constructed and arranged to mimic a set of host computers connected with the data storage equipment 104. Along these lines, the workload generation equipment 102 is constructed and arranged to generate test data 122 to be stored in the data storage equipment 104. In some embodiments, the workload generation equipment 102 is further constructed and arranged to provide a variety of different host IO requests 120 (e.g., block and/or file-based write commands, block and/or file-based read commands, combinations thereof, etc.) that direct the data storage equipment 104 to richly and reliably store the test data 122 within and retrieve the test data 122 from storage (e.g., primary storage or main memory, secondary storage, tiered storage, combinations thereof, etc.).

In some embodiments, the workload generation equipment 102 is constructed and arranged to obtain data characteristics of write data recorded in an IO trace. An IO trace is a group of records of completed IO operations. In some embodiments, each trace record in the IO trace includes a variety of data characteristics of a respective IO operation. For example, in some embodiments, a trace record of a write operation includes a timestamp of the write operation, an IO address at which the data storage system stored write data of the write operation, an IO size of the write operation, and an entropy value of the write data, and so forth. As will be described in further detail below, data characteristics recorded in an IO trace enable the generation of test data that accurately mimics write data of completed write operations without needing access to the write data itself.

Entropy is a measure of uncertainty and variability in a dataset. In some embodiments, the entropy value indicates entropy of write data of the completed write operation, e.g., a measure of uncertainty or variability of the write data. In some embodiments, the entropy is Shannon entropy and is defined according to the following formula, where p(x) is a frequency of a particular byte x in a data buffer of size X.

$$H(X) := -\sum_{x \in X} p(x) \log p(x) = \mathbb{E}[-\log p(X)]$$

If data is more random within the data buffer, the entropy value is higher.

Deduplication is a technique that replaces duplicate copies of data with pointers to a single stored copy of the data, providing greater storage efficiency. A deduplication ratio refers to an amount of storage reduction that the deduplication provides, e.g., if a data storage environment stores only one copy of data for three instances of the data, then the deduplication ratio for the data is 3:1. In general, deduplication and entropy are inversely correlated, i.e., as entropy increases, the amount of deduplication that can be performed decreases.

The data storage equipment 104 (e.g., a storage array, a storage system, etc.) includes storage processing circuitry 130 and a set of storage devices 132.

The storage processing circuitry 130 is constructed and arranged to respond to the host I/O requests 120 from the workload generation equipment 102 by writing data into and reading the data from the set of storage devices 132. In some embodiments, the storage processing circuitry 130 includes one or more physical storage processors (SPs) or engines, data movers, director boards, blades, I/O modules, storage device controllers, switches, other hardware, combinations thereof, and so on.

The set of storage devices 132 is constructed and arranged to provide persistent/non-volatile storage in accordance with one or more RAID data protection schemes. In some embodiments, the set of storage devices 132 includes one or more types of storage drives, e.g., non-volatile random access memory (NVRAM) devices, solid state drives (SSDs), hard disk drives (HDDs), combinations thereof, and so on. In some embodiments, at least some of the set of storage devices 132 provides non-volatile storage using a mapped-RAID architecture. Moreover, in accordance with certain embodiments, various physical componentry may be virtualized for additional flexibility, fault tolerance, load balancing, and so on (e.g., virtual data movers, virtual storage devices, etc.).

The communications medium 106 is constructed and arranged to connect the various components of the electronic environment 100 together to enable these components to exchange electronic signals 140 (e.g., see the double arrow 140). At least a portion of the communications medium 106 is illustrated as a cloud to indicate that the communications medium 106 is capable of having a variety of different topologies including backbone, hub and spoke, loop, irregular, combinations thereof, and so on. Along these lines, the communications medium 106 may include copper-based data communications devices and cabling, fiber optic devices and cabling, wireless devices, combinations thereof, etc. Furthermore, the communications medium 106 is capable of supporting LAN-based communications, SAN-based communications, cellular communications, WAN-based communications, distributed infrastructure communications, other topologies, combinations thereof, etc.

The other devices 108 represent other possible componentry of the electronic environment 100. Along these lines, the other devices 108 may include remote data storage equipment that provides data to and/or receives data from the data storage equipment 104 (e.g., replication arrays, backup and/or archiving equipment, service processors and/or management/control devices, combinations thereof, etc.).

It should be appreciated that electronic environment 100 is provided by way of example only and that other configurations are possible. For example, in some embodiments, one or more components of the electronic environment 100 are implemented via a virtual machine, while other components are physical hardware. Additionally or alternatively, in some embodiments, a single device is configured to operate at multiple components of the electronic environment 100. In some embodiments, electronic environment 100 is a sandbox.

During operation and as will be explained in further detail shortly, the workload generation equipment 102 uses one or more trace records from an IO trace to generate the test data 122 that meets particular entropy and deduplication requirements. Along these lines, the workload generation equipment 102 obtains an entropy value from a trace record of a completed write operation and identifies a particular data buffer from a predefined plurality of data buffers based on the entropy value.

Further during operation, the workload generation equipment 102 obtains a deduplication value indicating a target deduplication ratio of the test data in the electronic environment 100. In some embodiments, the workload generation equipment 102 selects the target deduplication ratio based on the entropy value.

Further during operation, the workload generation equipment 102 modifies at least part of particular data buffer based on the deduplication value to generate a modified data buffer. For example, in some embodiments, the workload generation equipment 102 replaces part of the particular data buffer with a predefined data sequence that is already stored in the data storage equipment 104. In this manner, the workload generation equipment 102 increases an amount of deduplication available to be performed on the resulting modified data buffer. The workload generation equipment 102 then provides the modified data buffer as the test data 122 to be stored in the data storage equipment 104.

Advantageously, identifying the particular data buffer based on the entropy value and modifying the particular data buffer based on the deduplication value enables the quick and efficient generation of test data that accurately matches write data of write operations recorded in an IO trace. It should be appreciated that, in some embodiments, the generation of test data occurs without the need to access the write data itself.

Further, it should be appreciated that accurate entropy and deduplication values are important when running certain simulations, e.g., ransomware simulations. Some ransomware attacks involve reading, encrypting, and writing large amounts of data in an attempt to restrict access to data. Entropy and deduplication values of write data provide insight into whether ransomware attack is occurring, as encrypted data typically has high entropy and low dedupability.

Further, it should be appreciated that certain data characteristics (e.g., entropy, IO size, etc.) recorded in IO traces are not system dependent. Such data characteristics do not rely on low-level operating system (OS) functions and do not require system-specific privileges. These data characteristics enable the creation of test data in a wide variety of testing environments. Further, use of such data characteristics enables simulations to be platform agonistic, i.e., IO traces acquired from a platform running a particular OS may be used in a testing environment running a different OS. Further details will now be provided with reference to FIG. 2.

Figure 2:
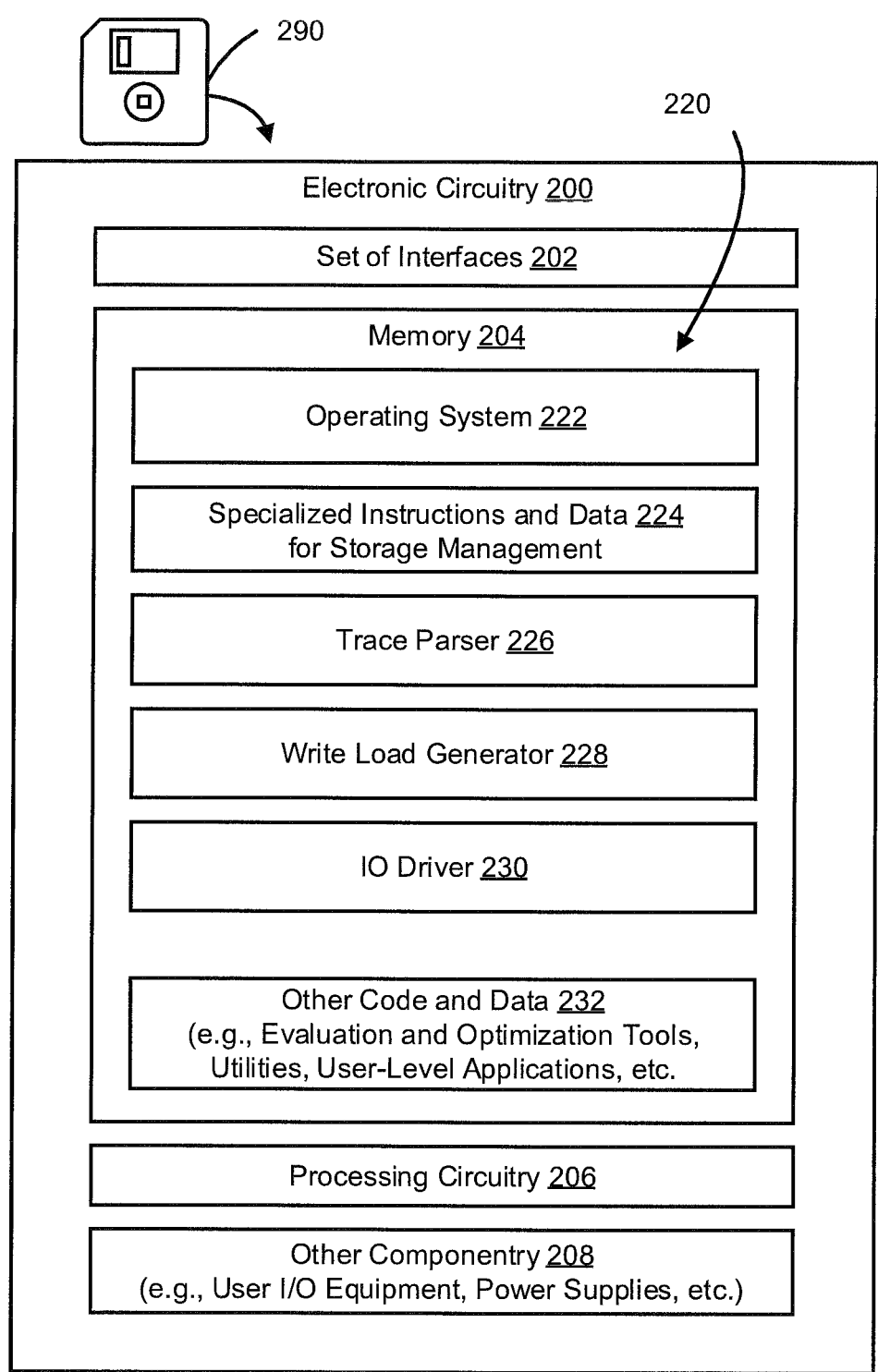
FIG. 2 is a block diagram of electronic circuitry in accordance with certain embodiments.

FIG. 2 is a block diagram of electronic circuitry 200 which is suitable for at least a portion of the data storage equipment 104 (FIG. 1) in accordance with certain embodiments. The electronic circuitry 200 includes a set of interfaces 202, memory 204, processing circuitry 206, and other componentry 208.

The set of interfaces 202 is constructed and arranged to connect the electronic circuitry 200 to the communications medium 106 to enable communications with other devices in the electronic environment 100 (e.g., the workload generation equipment 102). In some embodiments, the communications are IP-based, SAN-based, cellular-based, cable-based, fiber-optic-based, wireless, cloud-based, combinations thereof, etc. Additionally, the set of interfaces 202 is constructed and arranged to connect the electronic circuitry 200 to other local equipment such as the set of storage devices 132. In some embodiments, the set of interfaces 202 includes one or more host interfaces (e.g., a computer network interface, a fibre-channel interface, etc.), one or more storage device interfaces (e.g., a host adapter or HBA, etc.), and other interfaces. As a result, the set of interfaces 202 enables the electronic circuitry 200 to robustly and reliably communicate with various apparatus.

The memory 204 includes both volatile storage (e.g., DRAM, SRAM, etc.) and non-volatile storage (e.g., flash memory, magnetic memory, etc.). The memory 204 stores a variety of software constructs 220 including an operating system 222, specialized instructions and data 224, a trace parser 226, a write load generator 228, IO driver 230, and other code and data 232.

The operating system 222 refers to particular control code such as a kernel to manage computerized resources (e.g., processor cycles, memory space, etc.), the I/O stack (e.g., drivers), and so on. The specialized instructions and data 224 refer to particular instructions for storage management. In some arrangements, the specialized instructions and data 224 are tightly integrated with or part of the operating system 222 itself.

The trace parser 226 is constructed and arranged to obtain trace records from an IO trace and provide data character-istics from the trace records to the write load generator 228 and IO driver 230. In some embodiments, the data charac-teristics include a timestamp of a write operation, an IO address at which a data storage system stored write data of the write operation, an IO size of the write operation, and an entropy value of the write data, etc.

The write load generator 228 is constructed and arranged to generate the test data 122 to be stored in the data storage equipment 104. Along these lines, in some embodiments, the write load generator 228 is further constructed and arranged to generate a plurality of data buffers that satisfy particular entropy requirements. In some embodiments, the write load generator 228 is further constructed and arranged to modify parts of data buffers, e.g., to satisfy a particular deduplica-tion ratio. In some embodiments, the write load generator 228 is further constructed and arranged to combine multiple data buffers into a single data buffer.

The IO driver 230 is constructed and arranged to issue IO requests to the data storage equipment 104. In some embodi-ments, the IO driver 230 is constructed and arranged to issue IO requests based on the IO operations recorded in the IO trace (e.g., with similar timing and ordering of the IO operations recorded in the IO trace).

The other code and data 232 include applications and routines to provide additional operations and services (e.g., performance measurement tools, etc.), user-level applica-tions, administrative tools, utilities, and so on.

During operation, the trace parser 226 obtains a trace record of a completed write operation. The trace parser 226 then provides data characteristics from the trace record to write load generator 228 and the IO driver 230. Using the data characteristics, the write load generator 228 generates test data 122 that satisfies particular entropy and deduplica-tion requirements of a simulation. The IO driver 230 then issues a write request to write the test data 122 to the data storage equipment 104. Further details will now be provided with reference to FIG. 3.

FIG. 3 is a flowchart of a procedure 300 which is performed by specialized equipment in accordance with certain embodiments. The procedure 300 carries out a method of generating test data 122 in the electronic envi-ronment 100.

At 302, the write load generator 228 receives an entropy value and a deduplication value. The entropy value indicates an amount of entropy of write data of a completed write operation to be mimicked by the test data. The deduplication value indicates a target deduplication ratio of the test data in the predefined testing environment. In some embodiments, the write load generator 228 receives the entropy value from an IO trace. In some embodiments, the deduplication value is based on the entropy value. For example, in some embodi-ments, the write load generator 228 maintains a plurality of entropy ranges and maintains a respective range of dedu-plication values for each entropy range. In these embodi-ments, to select the deduplication value, the write load generator 228 maps the entropy value from the IO trace to a particular entropy range, and then selects the deduplication value from the respective range of deduplication values. In some embodiments, the write load generator 228 selects the deduplication value randomly from among the respective range of deduplication values, according to a predefined sequence or formula, combinations thereof, etc.

At 304, the write load generator 228 identifies, based on the entropy value, a particular data buffer from a predefined plurality of data buffers. In some embodiments, the write load generator 228 maps the entropy value to a particular range of entropy values, and selects the particular data buffer from a group of data buffers that have entropy values with the particular range of entropy values. In some embodi-ments, the write load generator selects the particular data buffer randomly from among the group of data buffers, according to a predefined sequence or formula, combina-tions thereof, etc.

In some embodiments, the write load generator 228 generates the plurality of data buffers prior to and/or during a simulation. In some embodiments, the write load generator 228 maintains data buffers that have entropy values across different ranges of entropy values. In some embodiments, the write load generator 228 generates additional data buf-fers when a number of available data buffers falls below a predefined number.

At 306, after identifying the particular data buffer, the write load generator 228 modifies at least part of the particular data buffer based on the deduplication value to generate a modified data buffer as the test data. In some embodiments, the write load generator 228 replaces part of the particular data buffer with a predefined data sequence that is already stored in the data storage equipment 104, e.g., to increase the amount of deduplication available to be performed on the resulting modified data buffer. In some embodiments, the write load generator 228 replaces part of the particular data buffer with a unique data sequence that is not stored in the data storage equipment 104, e.g., to decrease the amount of deduplication available to be per-formed on the resulting modified data buffer.

It should be appreciated that modifying the particular data buffer enables the write load generator 228 to use the particular data buffer multiple times during a simulation. For example, suppose that, after generating the modified data buffer, the write load generator 228 receives an instruction to generate additional test data that is different from the test data 122. In this example, the write load generator 228 may use the same particular data buffer (before modification) to generate the additional test data, even though the additional test data originated from the same data buffer. In this manner, the write load generator 228 increases storage efficiency and saves computing resources that would other-wise be spent generating new data buffers to be modified. Further details will now be provided with reference to FIG. 4.

Figure 4:
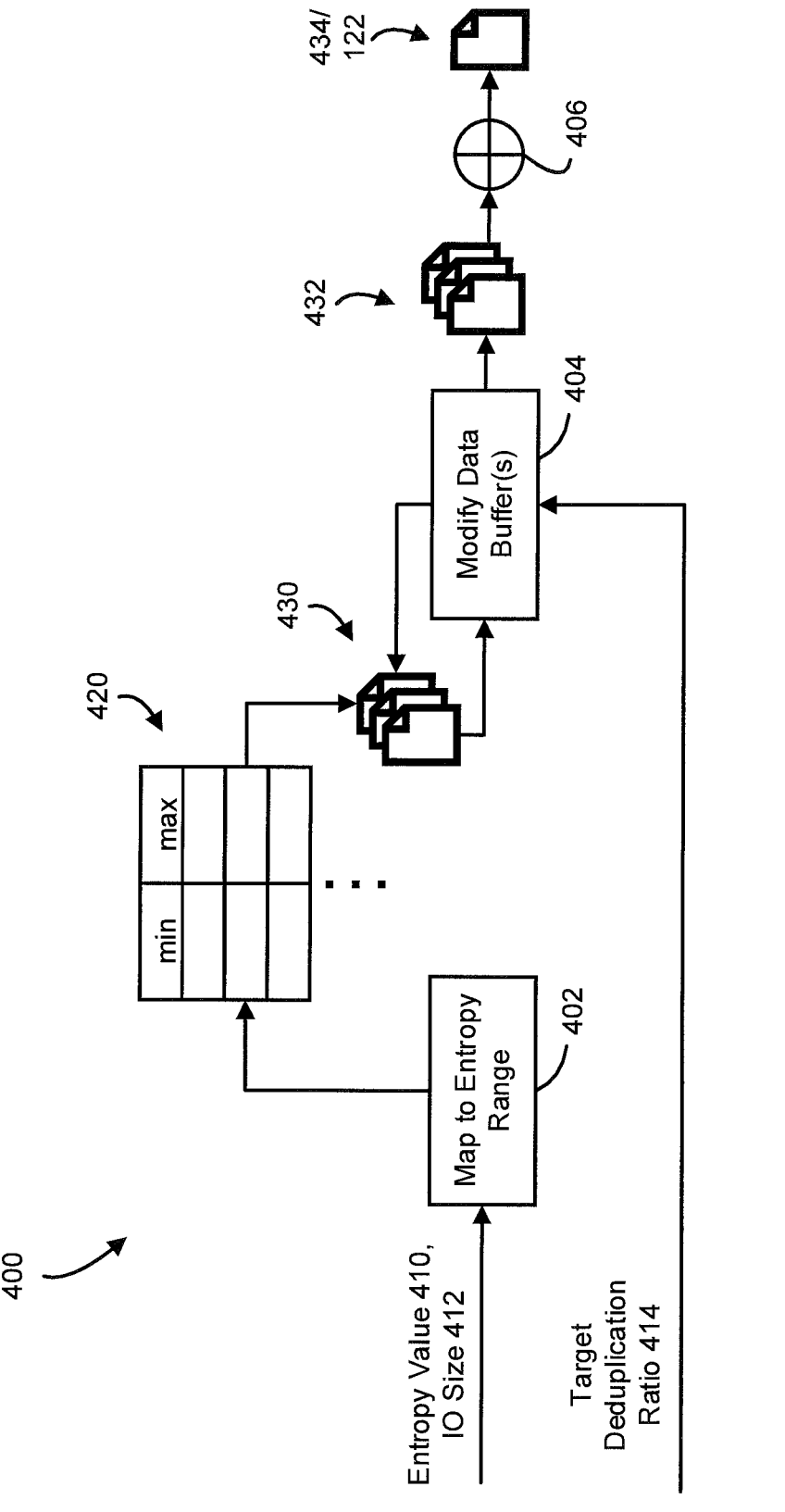
FIG. 4 is a block diagram illustrating test data generation in accordance with certain embodiments.

FIG. 4 a block diagram illustrating procedure 400 for generating the test data 122 in the electronic environment 100 in accordance with certain embodiments.

At 402, the write load generator 228 receives an entropy value 410 and IO size 412 and obtains a group of data buffers 430 that satisfy the entropy value 410 and the IO size 412. Along these lines, the write load generator 228 maintains a plurality of entropy ranges 420 and further maintains predefined data buffers having entropy values within respective entropy ranges. When the write load generator 228 receives the entropy value 410, the write load generator 228 maps the entropy value 410 to a respective entropy range in the plurality of entropy ranges 420. The write load generator 228 then obtains the group of predefined data buffers 430 from the predefined data buffers having entropy values within the respective entropy range. In some embodiments, the data buffers are a predefined size (e.g., 4 kB (kilobytes)), and the write load generator 228 obtains a number of data buffers sufficient to meet the IO size 412. In this manner, the write load generator 228 quickly and efficiently obtains data buffers at or near the entropy value 410 and IO size 410.

It should be understood that FIG. 4 is provided for example purposes, and in some embodiments, the plurality of entropy ranges 420 includes more or fewer ranges, e.g., based on capacity to meet throughput or accuracy requirements of a simulation. Similarly, in some embodiments, the write load generator 228 maintains more or fewer predefined data buffers, data buffers of different sizes, combinations thereof, etc.

At 404, the write load generator 228 modifies at least part of the group of data buffers 430 to generate a group of modified data buffers 432 that meet a target deduplication ratio 414. In some embodiments, the write load generator 228 replaces part of the group of data buffers 430 with one or more predefined data sequences that are already stored in the data storage equipment 104, e.g., to increase the amount of deduplication available to be performed. In some embodiments, the write load generator 228 replaces part of the group of data buffers 430 with a unique data sequence that is not stored in the data storage equipment 104, e.g., to decrease the amount of deduplication available to be performed.

At 406, the write load generator 228 combines the group of modified data buffers 432 to generate a combined data buffer 434. The write load generator 228 then provides the combined data buffer 434 as the test data 122 to be written to the data storage equipment 104.

In this manner, the write load generator 228 quickly and efficiently provides test data that satisfies entropy, size, and deduplication requirements of a simulation. Further details will now be provided with reference to FIG. 5.

Figure 5:
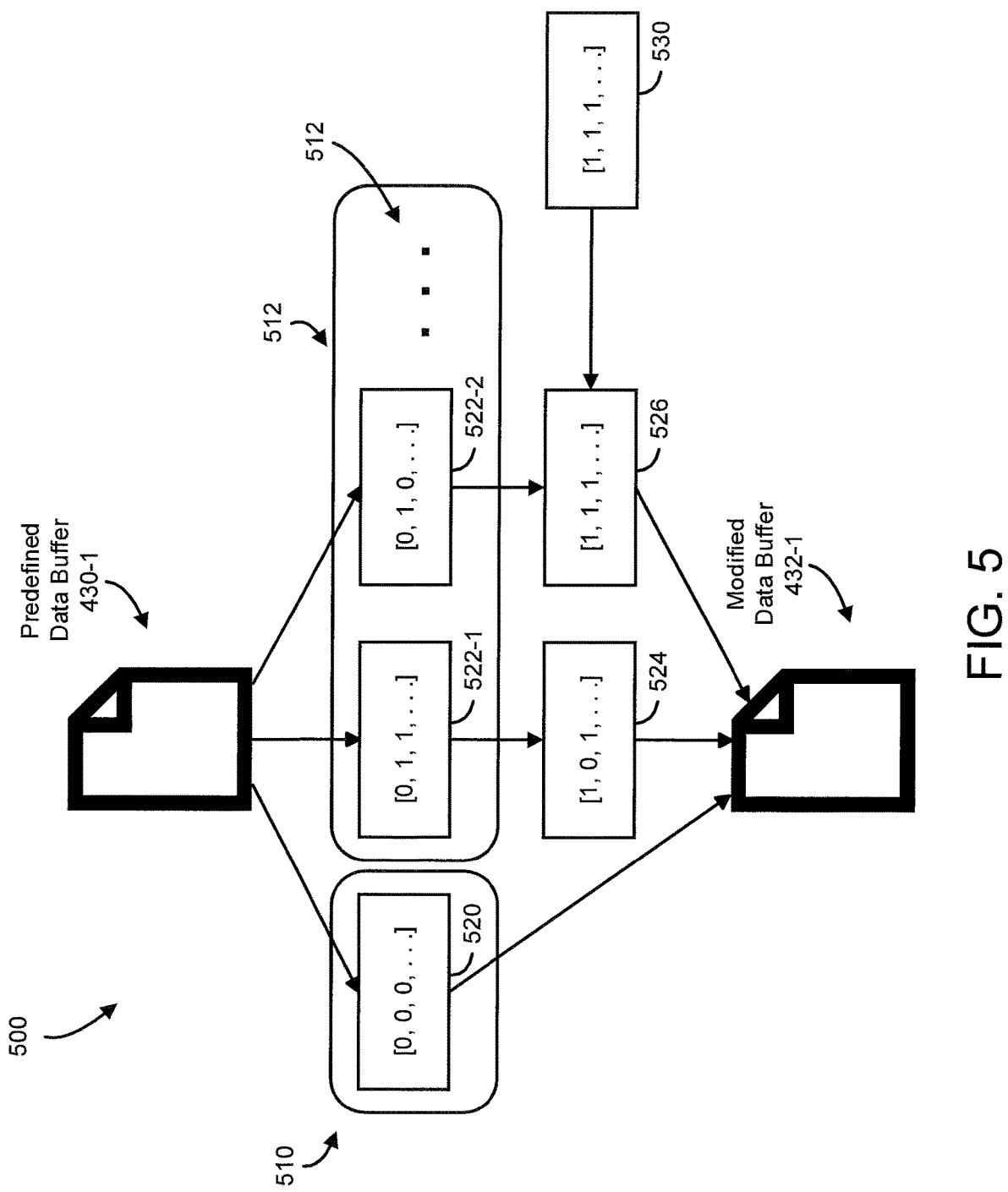
FIG. 5 is a block diagram illustrating test data generation in accordance with certain embodiments.

FIG. 5 is a block diagram illustrating procedure 500 in which the write load generator 228 adjusts a data buffer in accordance with certain embodiments. In some embodiments, the write load generator 228 performs procedure 500 during step 404 (FIG. 4). As shown, a predefined data buffer 430-1 includes a first data portion 510 having only zero bits (i.e., bits that are set to zero) and further includes a second data portion 512 having a combination of zero bits and non-zero bits (i.e., bits that have non-zero values). In some embodiments, the predefined data buffer 430-1 is part of the group of data buffers 430 (FIG. 4).

As shown, the first data portion 510 includes a data portion 520 that includes only zero bits. As further shown, the second data portion 520 includes data portion 522-1, data portion 522-2, . . . (collectively, data portions 522). It should be understood that FIG. 5 is provided for example purposes, and in some embodiments, the data portion 520 and the data portions 522 are intermixed, include more or fewer bits, combinations thereof, etc.).

In some embodiments, the size of the first data portion 510 is based on a target entropy range. For example, in some embodiments, the write load generator 228 maintains a respective range of zero bits for each entropy range in the plurality of entropy ranges 420. In these embodiments, when generating the predefined data buffer 430-1, the write load generator 228 selects a number within the respective range of zero bits for the selected entropy range to include in the first data portion 510. In some embodiments, the write load generator 228 selects a random number within the respective range of zero bits, selects the number of zero bits according to a predefined sequence or formula, combinations thereof, etc.

In some embodiments, when generating the predefined data buffer 430-1, the write load generator 228 fills the second data portion 512 with random data, e.g., a random combination of zero bits and non-zero bits.

When generating the modified data buffer 432-1, the write load generator 228 modifies the predefined data buffer 430-1, e.g., to meet the target deduplication ratio 414 (FIG. 4). In some embodiments, the write load generator 228 modifies some or all of the second data portion 512 and refrains from modifying the first data portion 510. In this manner, the entropy value of the modified data buffer 432-1 remains relatively similar to the entropy value of the predefined data buffer 430-1.

As shown, the write load generator 228 modifies the data portion 522-1 to generate a modified data portion 524. In some embodiments, the write load generator 228 replaces the data portion 522-1 with unique data that is not stored in the data storage equipment 104. In this manner, the write load generator 228 decreases the amount of deduplication that can be performed.

As further shown, the write load generator 228 replaces the data portion 522-2 with a predefined data portion 530 to generate a modified data portion 526. In some embodiments, a copy of the modified data portion 526 is already stored in the data storage equipment 104. In this manner, the write load generator 228 increases the deduplication ratio of the resulting test data 122.

The data portion 520, the data portion 524, and the data portion 526 form at least part of the modified data buffer 432-1. In this manner, the write load generator 228 enables a simulation to quickly and effectively generate test data that meets entropy and deduplication requirements of a simulation.

As described above, improved techniques are directed to generating test data using an IO trace of actual IO operations performed on a data storage system. Along these lines, a trace record from the IO trace provides an entropy value of write data of a completed write operation. A particular data buffer is obtained based on the entropy value. The particular data buffer is then modified to meet a target deduplication ratio. The modified data buffer is then provided as the test data.

One should appreciate that the above-described techniques do not merely collect and store data. Rather, the disclosed techniques are directed to generating test data to be stored in a predefined testing environment. Accordingly, such techniques enable a simulation in the testing environment to accurately reflect an actual IO workload.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the example environment 100 such as the data storage equipment 106, etc. are capable of being implemented in or "moved to" the cloud, i.e., to remote computer resources distributed over a network. Here, the various computer resources may be distributed tightly (e.g., a data storage system in a single facility) or over relatively large distances (e.g., over a campus, in different cities, coast to coast, etc.). In these situations, the network connecting the resources is capable of having a variety of different topologies including backbone, hub and spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN based communications, combinations thereof, and so on.

Conventional IO generation tools are used for testing performance and functionality of data storage systems. These conventional IO generation tools generate random data buffers having certain properties. However, buffers generated by conventional IO generation tools do not reflect semantics of user data provided in an IO trace.

In some embodiments, IO traces are collected on a customer side in order to debug a performance or a functional problem. In some embodiments, the IO traces do not have a real user data. However, in some embodiments, a trace record of an IO trace has some integral characteristics of user data used to issue IO requests, such as Shannon entropy, which is a measure of uncertainty or variability associated with random variables. In some embodiments, a trace recording tool captures timestamp, IO address (Logical Block Address (LBA)), IO size of a user IO, etc. and calculates entropy of real user data. In some embodiments, [TS, LBA, IO Size, and Entropy] forms a trace record.

Some embodiments use entropy of the blocks to generate semantically similar data meeting the following requirements:

Entropy of generated data is close to a target entropy from a trace record;

Able to reconstruct larger block size IO from smaller chunks;

Meet throughput requirements to support IO rate

Generated IO should support a configured deduplication rate

In some embodiments, the entropy of a generated data block directly depends on ratio of random and zero bits in such block. Because it is computationally expensive to generate a data buffer with exact Shannon entropy, some embodiments define N levels of Shannon entropies. These embodiments define a minimum and maximum number of zero bits so data buffers constructed would have an entropy from a particular level.

When initializing, some embodiments create a data buffer for each entropy level. These embodiments randomly select a number of zero bits in a respective range for an entropy level and fills up part of a buffer with zero bits and random data the other part. In some embodiments, the buffers are pre-generated to satisfy throughput requirements.

In some embodiments, the buffers fill up the pre-generated buffer table. In some embodiments, different instances have distinct buffers depending on the target deduplication ratio requested. In some embodiments, deduplication ratio is honored within an entropy level.

Some embodiments receive a request for a data buffer for <entropy, IO size, dedup ratio>. In some embodiments, IO size can be bigger than buffer size (e.g., because a trace generation tool aggregated IOs from an IO trace). These embodiments handle a large IO size using multiple blocks having the same entropy. Additionally or alternatively, these embodiments provide a vector of entropies for every basic block.

Some embodiments select as many data buffers as needed from the pre-generated table and passes them through a randomizer. In some embodiments, the randomizer performs a fast permutation of the part of a data buffer that includes random data. In some embodiments, a level of a permutation depends on a requested deduplication ratio.

Some embodiments combine multiple buffers into one by mixing dedupable and unique buffers.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of generating test data to be written in a predefined testing environment, the method comprising:

receiving an entropy value indicating an amount of entropy of write data of a completed write operation to be mimicked by the test data, and a deduplication value indicating a target deduplication ratio of the test data in the predefined testing environment;

identifying, based on the entropy value, a particular data buffer from a predefined plurality of data buffers; and after identifying the particular data buffer, modifying at least part of the particular data buffer based on the deduplication value to generate a modified data buffer as the test data;

wherein modifying at least part of the particular data buffer includes:

replacing at least part of the particular data buffer with a predefined sequence of bits to increase an amount of deduplication available to be performed on the modified data buffer.

2. The method of claim 1, further comprising:

replacing at least part of a second data buffer with a unique sequence of bits to decrease an amount of deduplication available to be performed on the second data buffer as modified, the unique sequence of bits being unique from data stored in the predefined testing environment.

3. The method of claim 1, further comprising:

pre-generating the particular data buffer to include a first group of bits and a second group of bits, each bit in the first group of bits having a value of zero, a number of bits in the first group of bits being based on a target entropy range.

4. The method of claim 3 wherein modifying at least part of the particular data buffer includes:

adjusting the second group of bits while refraining from adjusting the first group of bits to maintain entropy of the particular data buffer within the target entropy range.

5. The method of claim 1, further comprising:

generating, as the predefined plurality of data buffers, a first set of data buffers and a second set of data buffers, the first set of data buffers having a respective first set of entropy values within a first range of entropy values, the second set of data buffers having a respective second set of entropy values within a second range of entropy values;

wherein identifying the particular data buffer from the predefined plurality of data buffers includes:

mapping the entropy value of the write data to the first range of entropy values; and in response to mapping the entropy value of the write data to the first range of entropy values, providing the particular data buffer from the first set of data buffers.

6. The method of claim 1 wherein receiving the entropy value includes:

obtaining the entropy value from an input/output (IO) trace of the completed write operation, the completed write operation being performed on a first platform running a first operating system (OS); and wherein the method further comprises:

writing the test data on, as the predefined testing environment, a second platform running a second OS that is different from the first OS.

7. The method of claim 1, further comprising:

receiving an IO size of the write data to be mimicked by the test data, the IO size being larger than the particular data buffer; and combining the modified data buffer with a second modified data buffer to generate a combined data buffer that matches the IO size of the write data.

8. The method of claim 1, further comprising:

after modifying at least part of the particular data buffer to generate the modified data buffer, receiving an instruction to generate additional test data;

in response to receiving the instruction to generate additional test data, identifying the particular data buffer from the predefined plurality of data buffers; and modifying the particular data buffer to generate a second modified data buffer as the additional test data, the second modified data buffer being different from the modified data buffer.

9. The method of claim 1 wherein the completed write operation occurred as part of an actual ransomware attack; and wherein the method further comprises:

issuing a write request to store the test data to storage of the testing environment as part of a simulated ransomware attack in the testing environment, the simulated ransomware attack being a simulation of the actual ransomware attack.

10. An electronic apparatus, comprising:

memory; and control circuitry coupled with the memory, the memory storing instructions that, when carried out by the control circuitry, cause the control circuitry to perform a method of generating test data to be written in a predefined testing environment, the method including:

receiving an entropy value indicating an amount of entropy of write data of a completed write operation to be mimicked by the test data, and a deduplication value indicating a target deduplication ratio of the test data in the predefined testing environment;

identifying, based on the entropy value, a particular data buffer from a predefined plurality of data buffers; and after identifying the particular data buffer, modifying at least part of the particular data buffer based on the deduplication value to generate a modified data buffer as the test data;

wherein modifying at least part of the particular data buffer includes:

replacing at least part of the particular data buffer with a unique sequence of bits to decrease an amount of deduplication available to be performed on the modified data buffer, the unique sequence of bits being unique from data stored in the predefined testing environment.

11. The electronic apparatus of claim 10, further comprising:

replacing at least part of a second data buffer with a predefined sequence of bits to increase an amount of deduplication available to be performed on the second data buffer as modified.

12. The electronic apparatus of claim 10, further comprising:

pre-generating the particular data buffer to include a first group of bits and a second group of bits, each bit in the first group of bits having a value of zero, a number of bits in the first group of bits being based on a target entropy range.

13. The electronic apparatus of claim 12 wherein modifying at least part of the particular data buffer includes:

adjusting the second group of bits while refraining from adjusting the first group of bits to maintain entropy of the particular data buffer within the target entropy range.

14. The electronic apparatus of claim 10, further comprising:

generating, as the predefined plurality of data buffers, a first set of data buffers and a second set of data buffers, the first set of data buffers having a respective first set of entropy values within a first range of entropy values, the second set of data buffers having a respective second set of entropy values within a second range of entropy values;

wherein identifying the particular data buffer from the predefined plurality of data buffers includes:

mapping the entropy value of the write data to the first range of entropy values; and in response to mapping the entropy value of the write data to the first range of entropy values, providing the particular data buffer from the first set of data buffers.

15. The electronic apparatus of claim 10 wherein receiving the entropy value includes:

obtaining the entropy value from an input/output (IO) trace of the completed write operation, the completed write operation being performed on a first platform running a first operating system (OS); and wherein the method further comprises:

writing the test data on, as the predefined testing environment, a second platform running a second OS that is different from the first OS.

16. The electronic apparatus of claim 10, further comprising:

receiving an IO size of the write data to be mimicked by the test data, the IO size being larger than the particular data buffer; and combining the modified data buffer with a second modified data buffer to generate a combined data buffer that matches the IO size of the write data.

17. A computer program product having a non-transitory computer readable medium that stores a set of instructions to generate test data to be written in a predefined testing environment, the set of instructions, when carried out by computerized circuitry, causes the computerized circuitry to perform a method of:

receiving an entropy value indicating an amount of entropy of write data of a completed write operation to be mimicked by the test data, and a deduplication value indicating a target deduplication ratio of the test data in the predefined testing environment;

identifying, based on the entropy value, a particular data buffer from a predefined plurality of data buffers; and after identifying the particular data buffer, modifying at least part of the particular data buffer based on the deduplication value to generate a modified data buffer as the test data;

wherein modifying at least part of the particular data buffer includes:

replacing at least part of the particular data buffer with a predefined sequence of bits to increase an amount of deduplication available to be performed on the modified data buffer.

18. The method of claim 1, wherein modifying at least part of the particular data buffer further includes:

prior to replacing at least part of the particular data buffer with the predefined sequence of bits, acquiring the predefined sequence of bits from bits previously written to storage of the predefined testing environment.

*  *  *  *  *